United States Patent [19]
Weidt

[11] Patent Number: 5,287,970
[45] Date of Patent: Feb. 22, 1994

[54] LOAD CARRIER OF PLASTIC AND TOOL FOR THE PRODUCTION OF SAME

[75] Inventor: Karl A. Weidt, Siegen, Fed. Rep. of Germany

[73] Assignee: Fritz Schäfer Gesellschaft mit beschränkter Haftung, Neunkirchen, Fed. Rep. of Germany

[21] Appl. No.: 867,196
[22] PCT Filed: Nov. 8, 1991
[86] PCT No.: PCT/EP91/02109
  § 371 Date: Jun. 25, 1992
  § 102(e) Date: Jun. 25, 1992
[87] PCT Pub. No.: WO92/08650
  PCT Pub. Date: May 29, 1992

[30] Foreign Application Priority Data
Nov. 14, 1990 [DE] Fed. Rep. of Germany ....... 4036178

[51] Int. Cl.$^5$ ............................................. B65D 9/34
[52] U.S. Cl. ................... 206/599; 108/51.1; 108/51.3; 220/605; 425/577; 425/588
[58] Field of Search ............ 220/605, 606, 604, 608; 206/599; 108/51.1, 51.3, 56.1; 425/542, 577, 567, 588

[56] References Cited

U.S. PATENT DOCUMENTS

| | | | |
|---|---|---|---|
| Re. 32,344 | 2/1987 | Wind | 206/599 |
| 3,930,780 | 8/1976 | Lovejoy | 425/577 |
| 3,977,821 | 8/1976 | Lovejoy | 425/577 |
| 3,995,749 | 12/1976 | Haskins | 206/599 |
| 4,750,633 | 6/1988 | Schafer | 206/599 |
| 4,790,249 | 12/1988 | Webb | 206/599 |
| 5,180,064 | 1/1993 | Elvin-Jensen | 206/599 |

Primary Examiner—Joseph Man-Fu Moy
Attorney, Agent, or Firm—Anderson Kill Olick & Oshinsky

[57] ABSTRACT

A load carrier 1 of plastic, particularly a storage and transporting box or container as well as a pallet or shelf, is suggested in which a base 2 having a planar upper surface is stabilized on the underside by stiffening ribs 3 and in which flat foot strips 5 lying in the direction of the base plane extend at least along two defining edges 4 of the base 2 running parallel to one another, are supported at a distance below the base plane by webs 6 directed transversely relative to the respective defining edge 4, and form stand surfaces of the load carrier 1, wherein there are free spaces 7, 7a between the underside 2a of the base, the upper side of the foot strips and the transversely directed webs 6, which free spaces 7, 7a are enclosed to form pockets and are open at least toward the defining edge 4.

The trouble-free, dynamic use of such load carriers 1 is improved in that the end portions 9 of the flat foot strips 5 are formed by parts 10 which are curved upward transversely relative to their longitudinal direction in the shape of a ski until meeting the underside 2a of the base and have a secure connection 11 at the base 2 and accordingly simultaneously form an end web serving to define a pocket-like free space.

16 Claims, 3 Drawing Sheets

LOAD CARRIER OF PLASTIC AND TOOL FOR THE PRODUCTION OF SAME

The subject matter of the invention is a load carrier of plastic such as is used particularly as a storage and transporting box or container and as a pallet or shelf in storage and transporting systems for merchandise.

The subject matter of the invention is also a tool such as is used for the production of such load carriers of plastic.

The invention is based on such load carriers of plastic in which a base having a planar upper surface is stabilized on the underside by stiffening ribs and in which flat foot strips lying in the direction of the base plane extend at least along two side edges of the base running parallel to one another, are supported at a distance below the base plane by cross-pieces or webs directed transversely relative to the respective side edge, and form standing surfaces of the load carrier. Between the underside of the base, the upper side of the foot strips and the transversely directed webs, there are free spaces which are enclosed to form pockets and are open at least toward the side edge.

Load carriers of plastic having such a basic construction already belong, as box-shaped containers particularly in the form of storage and transporting boxes, to the prior art as known from DE-GM 81 37 907 and DE-GM 89 02 719.

The purpose of this known construction of load carriers of plastic is to provide planar running surfaces for conveying on transporting paths, e.g. roller conveyors, by means of the special arrangement of foot strips below the base itself when the base of the load carrier tends in general to bend in a troublesome manner under the load of the merchandise resting on it.

In the known load carriers, undesirable bending is already countered to a great extent by the special arrangement, in itself, of foot strips beneath the underside of the base. This fact manifests itself in a positive sense particularly when the respective load carrier has already been used for longer periods within a shelf installation for storing the merchandise resting thereon prior to transporting, which is carried out e.g. via roller conveyors, and when it has been supported only by two carrying or supporting strips which only act laterally.

Although increased usefulness with respect to a combined use in shelf installations and on transporting paths has been achieved already by the known manner of outfitting the load carrier of plastic with flat foot strips situated at a distance from one another beneath the underside of the base and by the resulting stabilization, the known load carriers still have disadvantages resulting from the known design shape of their base region and the flat foot strips adjoining the latter at the bottom.

The tools used for producing the known load carriers of plastic are basically designed in such a way that after removal from the mold, which is effected by moving apart the different tool parts, they leave behind a shaping which is completely planar and determined by 90-degree defining edges in the area where the underside of the flat foot strips which forms the running surfaces ends in the base corner regions. This final shaping of the foot strips which is completely planar and determined by substantially right-angled defining edges can easily result in an unwanted hooking of the load carriers not only when they slide into a shelf receptacle, but also as they move along transporting paths, e.g. via roller conveyors, and can accordingly lead to sensitive disturbances in the normal course of the storage and transporting operation. Moreover, such troublesome hooking between the load carriers and the shelf and transporting installations can also lead to damage and destruction of the load carriers themselves.

In order to overcome these disadvantages, the invention has the object of improving load carriers of plastic, particularly storage and transporting boxes or containers, as well as pallets or shelves of the generic type in such a way that the load carriers are effectively prevented from hooking and/or hanging in an unwanted fashion with their foot strips at functional parts of shelf installations and/or conveying paths entering into a working connection with them.

This proposed object is met according to the invention fundamentally in that the end portions of the flat foot strips are formed by parts which are curved upward transversely relative to their longitudinal direction in the shape of a runner or ski against the underside of the base and are securely fastened at the base—at the underside of the base—and accordingly simultaneously form an end web serving to define a pocket-like free space.

In box-shaped containers of sheet metal which are composed of individual walls it has already been suggested in DE-GM 87 12 665 to form the horizontal container edges adjoining the transverse walls of the container, as well as the container corners on the base side with a large radius in order to prevent damaging collisions with parts of the conveyor paths.

Until now, however, as evidenced e.g. by DE-OS 36 33 171, load carriers of plastic, namely storage and transporting boxes for shelf storage, were provided only with outwardly directed, horizontal webs below the base, i.e. at the lower edge of a frame formed by stiffening ribs. These webs extend along only a part of the length of the base or longitudinal walls and have end portions with rounded portions which extend upward against a cross-piece and facilitate a sliding into supporting strips of shelf receptacles, which supporting strips are situated only at the sides. However, in this construction there is no facilitation of the interplay with functional parts of transporting and/or conveying paths. That is, the transverse side of the frame formed beneath the base by the stiffening ribs is arranged in front of the rounded portions of the outwardly directed horizontal webs by a considerable extent and has a construction which is at least similar to that of the load carriers of the generic type according to DE-GM 81 37 907 and DE-GM 89 03 430. Consequently, it also has their disadvantages.

In another construction of the invention it is provided that the flat foot strips are assigned at least to the two longitudinal side edges of the base of a load carrier. It is particularly advantageous that the load carrier have flat foot strips in the region of the longitudinal side edges as well as in the region of the transverse side edges of the base.

The invention is usable regardless of whether or not the load carrier and its base have a rectangular or a square outline.

According to the invention, a successful construction form for the load carrier is that in which flat foot strips extend along all four side edges of the rectangular or square base. However, only two parallel flat foot strips have associated end webs which curve upward in the manner of a ski. In the simplest instance, the end webs which are curved upward in the manner of a ski have a width corresponding to the width of the adjoining foot strips.

According to another construction, however, it is also possible that the width of the end webs which are curved upward in the manner of a ski exceeds the width of the adjoining foot strips in such a way that the end webs also extend along a partial length of the transversely extending flat foot strips.

A particularly advantageous construction of load carriers consists in that the end webs which are curved upward in a bow-shaped manner extend in a continuous manner along the entire length of the transversely extending flat foot strips and along with the latter enclose correspondingly deep, pocket-like free spaces below the base.

In this case it is then possible for two pocket-like free spaces which are flush with one another to be partitioned or delimited relative to one another by a dividing wall lying on half the length of the transversely extending flat foot strip.

An advantageous construction for the load carrier and its base, particularly when the latter have a square outline, is characterized in that end webs which are curved upward in the manner of a bow are provided only in the four corner regions of the flat foot strips which converge at right angles and these end webs extend around these corner regions with a curvature of 90°.

In this case diagonally extending stiffening ribs which, together with the flat foot strips, enclose pockets opening inward, i.e. toward the center of the base, can be provided at the end webs which enclose the corner regions and are curved upward in the manner of a ski.

A tool for the production of load carriers of plastic which, in addition to a tool part determining the flat and smooth inner shape of the load carrier, also comprises a plurality of tool parts which are movable relative to one another and determine the outer shape of the load carrier, which outer shape is provided with ribs, webs, reliefs or the like, is substantially characterized according to the invention in that the tool parts forming the free spaces which are defined in a pocket-like manner between the flat foot strips and the underside of the base are designed as core pieces which sit at side jaws, which are movable parallel to the base plane, and project out laterally in a comb-like manner. End core pieces of these core pieces have rounded portions which extend in their longitudinal or movement direction, the shaping of these rounded portions corresponding to the inner contour of the end webs which are curved upward in the manner of a ski at the flat foot strips. The shaping elements determining the outer contour of these end webs which are curved upward in the manner of a ski are conventionally located at that tool part determining the shaping of the base region of the outer shape at the load carrier.

In a further construction of the tool it is provided that the length of the core pieces in each instance corresponds to the depth of the free spaces which are enclosed in a pocket-like manner, while the length of the end core pieces is adapted to the width of the end webs which adjoin the foot strips and are curved upward in the manner of a ski.

According to the invention, the end core pieces can be lengthened so as to project forward relative to the comb-like core pieces. The lengthening of the end core pieces can be designed in such a way that two oppositely located end pockets at the load carrier meet one another in the center under the underside of the base and accordingly combine the connections of the end webs on the base side to form a continuous connecting strip.

But it is also possible, according to the invention, to lengthen the end core pieces relative to the comb-like core pieces so that they project out in front only far enough to form end pockets at the load carrier which exceed the width of the flat foot strips in the direction of the longitudinal center of the load carrier. The connection of the end webs at the underside of the base is accordingly substantially widened.

Finally, another type of construction of a tool for producing load carriers of plastic is characterized in that the tool parts forming the free spaces defined in a pocket-like manner between the flat foot strip and the underside of the base are designed as core pieces which are arranged at side jaws, which are movable parallel to the base plane, and project out laterally in a comb-like manner, the end core pieces of the core pieces assigned to the corner regions being provided with bevels which extend in the direction of the angle bisecting lines toward the respective corner region and terminate in a rounded portion enclosing an arc angle of 45°, and in that a diagonally movable core form below the base is assigned, in addition, to every corner region.

Embodiment examples of the invention are explained in detail in the following with reference to the drawing.

In order to explain the invention, different construction forms of the storage and transporting boxes or containers 1a and 1b are shown in the drawing as embodiment examples of load carriers 1 of plastic.

The load carriers 1 of plastic can also have a relatively flat construction, that is, they can be so-called pallets or shelves, wherein the former generally have no longitudinal or transverse walls projecting from the base, while the latter have only relatively low longitudinal and transverse edge rims projecting up from the base.

A feature common to all possible construction types of load carriers 1 is that of a base 2 which is provided at least substantially with a planar upper side and stabilized at its underside by a system of stiffening ribs 3 which are formed on so as to form one piece with it, as can clearly be seen in FIGS. 4 to 8.

Another feature common to all load carriers 1, which is shown in the drawing with reference to the example of the storage and transporting boxes or containers 1a and 1b, is that of flat foot strips 5 lying in the direction of the base plane and extending at least along two defining edges 4 of the base 2 which run parallel to one another. These foot strips 5 are supported at a distance below the plane of the base 2 by webs 6 which are directed transversely relative to the respective defining edge 4 and project vertically from the underside of the base 2. The foot strips 5 form the actual standing surfaces of the load carrier 1, e.g. of the storage and transporting box or container 1a and 1b, as is made clear by FIGS. 1 and 2 of the drawing.

Free spaces 7 are enclosed in the manner of pockets between the underside of the base 2, the upper side of the foot strips 5, and the transversely directed webs 6 and have an opening at least in the direction of the adjacent defining edge 4 of the base 2. The pocket-like free spaces 7 can be closed in each instance by a wall 8 toward the inside, i.e. toward the flat zone of the base 2 outfitted with the stiffening ribs 3, as can be seen from FIGS. 4 to 8. However, if required, they can also be at least partially open or provided with openings, respectively, in the location where walls 8 are provided according to the drawing, for example, if a virtually unimpeded passage of cleaning fluids, e.g. in the form of liquid jets, is desired.

The outfitting of load carriers 1, e.g. storage and transporting boxes or containers 1a and 1b, with the flat foot strips 5 lying in the direction of the base plane at a distance from the latter ensures not only that the entire surface of the base 2 offers a planar supporting surface for the goods and merchandise resting thereon, but moreover that a faultless supporting surface for the respective load carrier itself is provided which ensures a high degree of stability of same, regardless of whether or not it is loaded. This is true even if the surface region of the base 2 provided at the underside with stiffening ribs 3 should bend under a load, since this bending can not propagate toward the flat foot strips 5 due to the presence of the pocket-like free spaces 7 which are delimited relative to one another by the webs 6.

It also follows from the drawing that it is of substantial importance to form the end portions 9 of the flat foot strips 5 by means of parts 10 which are curved upward transversely relative to the longitudinal direction of the foot strips 5 in the manner of a ski against the underside of the base 2 and which are securely fastened to the base 2 and accordingly simultaneously form an end web serving to define a pocket-like free space 7a.

Figure 1:
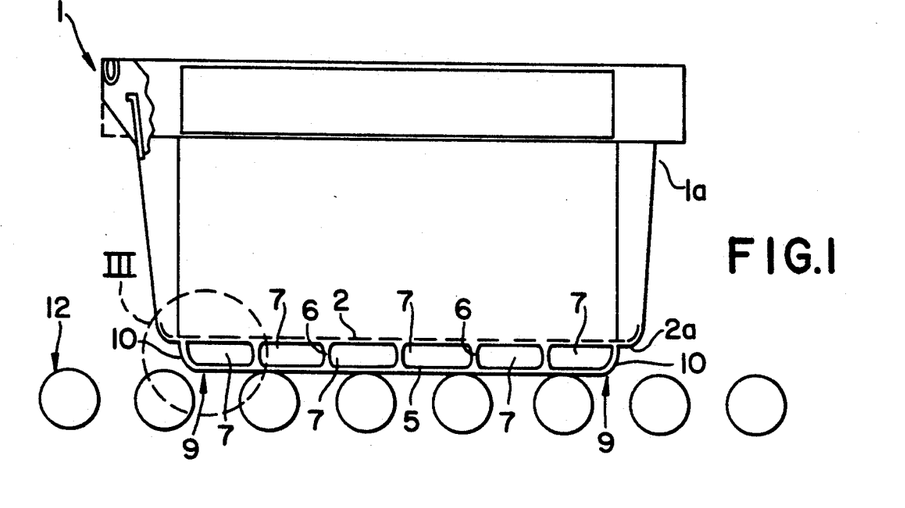
FIG. 1 is a side view of a storage and transporting box which serves as a load carrier and is placed on a roller transporting path and has a spatial shape which narrows in diameter from its opening to its base so that one storage and transporting box may be placed inside another when empty.
Figure 2:
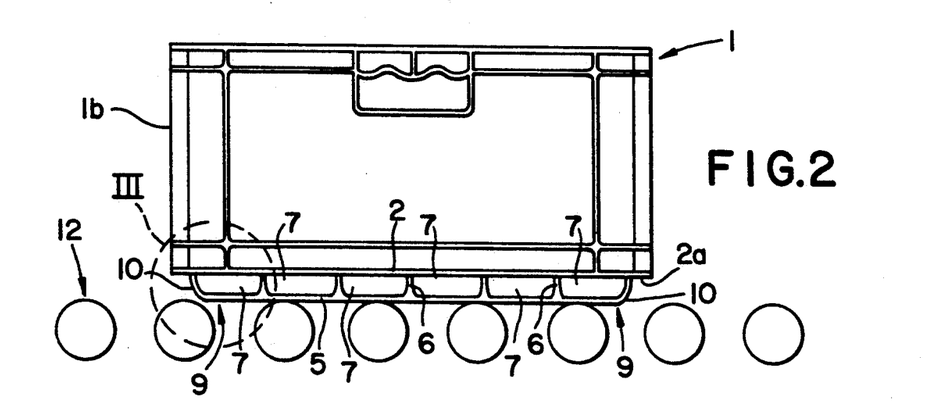
FIG. 2 likewise shows a side view of a storage and transporting box which serves as a load carrier and is capable of being stacked and is placed on a roller transporting path.
Figure 3:
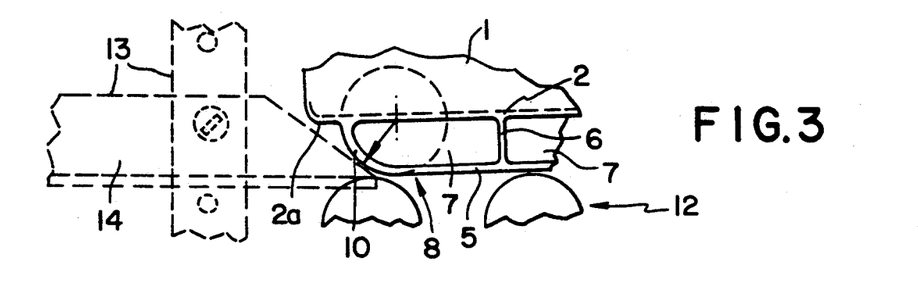
FIG. 3 is an enlarged partial view of the sectional area characterized in FIGS. 1 and 2 by III.

The end portions 9 which are curved upward in the manner of a ski, or their parts 10 forming the end webs, preferably have the shape of a quarter circle as can be seen particularly from FIG. 3 and serve chiefly to ensure a trouble-free running of the load carrier 1 or storage and transporting box or container 1a and 1b along transporting paths, e.g. roller transporting paths 12 with a plurality of running rollers arranged closely one after the other, as can be seen in FIGS. 1 to 3. At the same time, the end portions 8 or parts 10 of the flat foot strips 5 which are curved upward in the manner of a ski against the underside 2a of the base 2 also ensure a trouble-free insertion of the load carrier 1 or storage and transporting boxes or containers 1a and 1b into the storage planes of a shelf installation 13, e.g. into the compartments or supporting and guiding rails 14 of same, as is shown in dashed lines in FIG. 3.

Normally, flat foot strips 5 are assigned to at least two parallel defining edges 4 of the base 2. In the case of load carriers 1 or storage and transporting boxes or containers 1a and 1b having a rectangular outline these are generally the two longitudinal side edges 4a of the base 2, as is shown in FIG. 5. However, it can prove particularly advantageous to assign the flat foot strips 5 to the longitudinal side edges 4a as well as to the transverse side edges 4b of the base 2 at the load carrier 1 as can be seen from FIGS. 4 and 6 for a load carrier 1 having a rectangular outline and from FIGS. 7 and 8 for a load carrier 1 with a square outline.

In the load carrier 1 of the constructional type shown in FIG. 1 constructed as storage and transporting box or container 1a, flat foot strips 5 extend along all four defining edges 4 as well as along the two longitudinal side edges 4a and the two transverse side edges 4b of the base 2 having a rectangular outline. Moreover, it can be seen from FIG. 4 that the end portions 9 or their parts or end webs 10 which are curved upward in the manner of a ski extend continuously along the entire length of the transversely extending flat foot strips, that is, are assigned to the entire width of the base 2. The free spaces 7a which are enclosed in a pocket-like manner accordingly extend along the entire width of the underside 2a of the base 2 substantially in the direction of the transverse side edges 4b and are divided by means of a dividing wall 15 which lies along half the length of the transversely extending flat foot strip 5 and can be regarded as a lengthening of a stiffening rib 3 at the underside 2a of the base 2.

In the load carrier 1 according to FIG. 5 which is likewise constructed as a storage and transporting box or container 1a, the end portions 9 of the flat foot strips 5 which are curved upward in the manner of a ski against the base underside 2a, or the parts or end webs 10 forming the end portions 9, do not extend along the entire width of the base 2. However, the width of the parts or end webs 10 which are curved upward in the manner of a ski is dimensioned in such a way, as can be seen, that it perceptibly exceeds the width of the foot strips 5 assigned only to the longitudinal side edges 4a. Thus, in this case the end portions 9 or the parts or end webs 10 forming the latter also extend along a partial length of the transverse side edges 4b which are not outfitted with a flat foot strip. In this case stiffening ribs 3 are also provided at the underside 2a of the base 2 where the base 2 has no transversely extending flat foot strip 5. The free spaces 7a which are enclosed in a pocket-like manner in the storage and transporting box or container 1a according to FIG. 5 have a greater depth than the rest of the pocket-like free spaces 7 which are situated only below the flat foot strips 5 extending parallel to the longitudinal side edges 4a of the base 2. To this extent the load carrier 1 according to FIG. 5 is a variant of the load carrier 1 according to FIG. 4.

Figure 4:
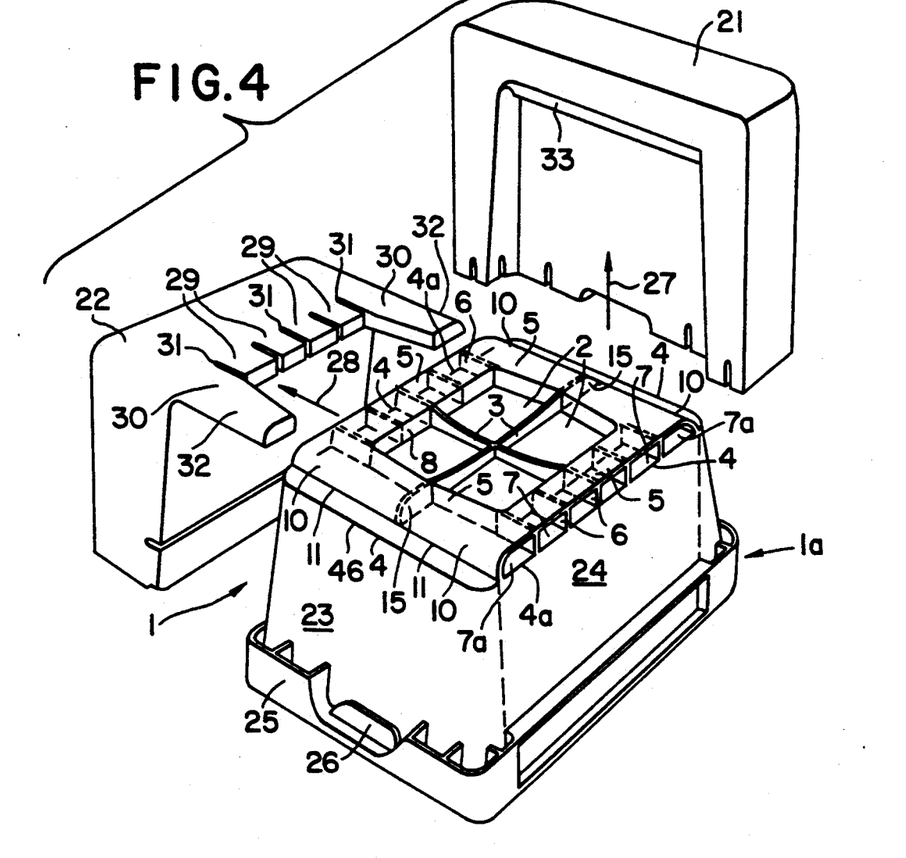
FIG. 4 is a three-dimensional view of the storage and transporting box according to FIG. 1 with its base region facing upward, together with parts of a tool serving to produce it, which tool is shown in its final shaping position.
Figure 5:
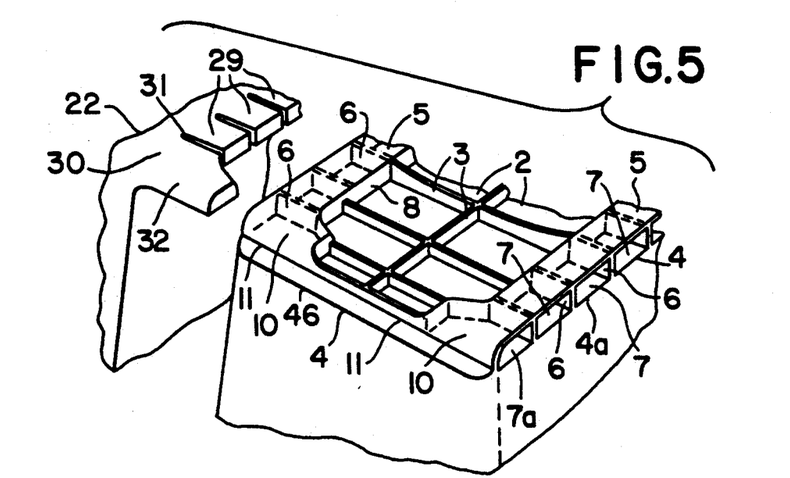
FIG. 5 is a three-dimensional partial view of the storage and transporting box according to FIG. 4 in a somewhat modified construction together with a tool part shown in the final shaping position.
Figures 6, 7, 8:
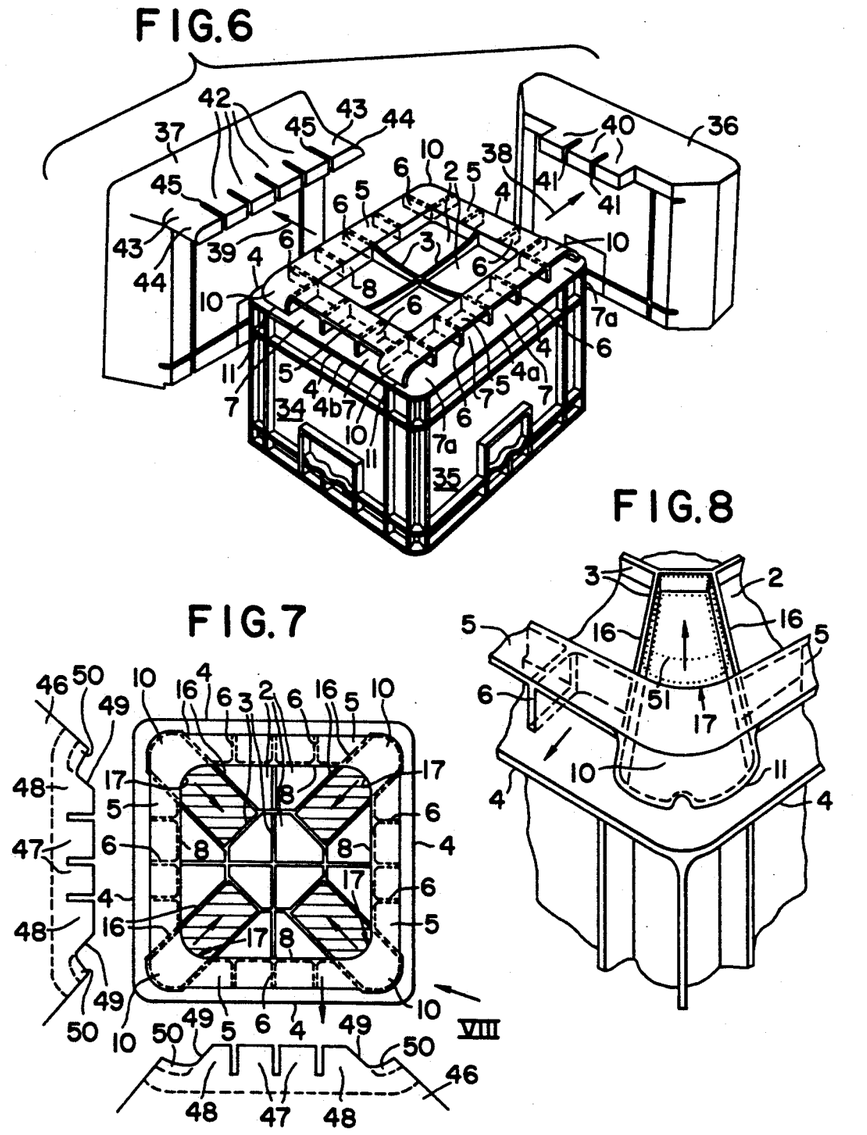
FIG. 6 is another three-dimensional view of the storage and transporting box according to FIG. 2 which is positioned so that its base region is directed upward and of respective tool parts in their final shaping position.
FIG. 7 shows the underside of another load carrier with square outline and with respective tool parts in their final shaping position.
FIG. 8 is an enlarged three-dimensional view of the sectional area of the box according to FIG. 7 characterized by VIII.

Whereas the load carrier 1 according to FIGS. 1, 4 and 5 which is constructed as a storage and transporting box or container 1a is a construction having a spatial form which reduces in diameter from the opening to the base 2, a plurality of which can be placed one inside the other when empty in order to economize on space, FIGS. 2 and 6 to 8 show storage and transporting boxes or containers 1b having a construction enabling stacking. FIG. 6 refers to a storage and transporting box or container 1b with a rectangular outline, while FIG. 7 and 8 show a storage and transporting box or container 1b with a square outline.

In both cases flat foot strips 5 are present along all four defining edges 4 of the base 2, that is, along the longitudinal side edges 4a as well as along the transverse side edges 4b, and are connected with the underside 2a of the base 2 at a distance from the latter by transversely directed webs 6 so as to form one piece. Pocket-like free spaces 7 are enclosed between the underside 2a of the base 2 and the flat foot strips 5 along all four defining edges 4 of the base 2 as can clearly be seen in FIGS. 6 to 8.

In the storage and transporting box or container 1b according to FIG. 6, the end portions 9 or the parts or end webs 10 forming the latter which are curved upward in the manner of a ski against the underside 2a of the base 2 are assigned only to the flat foot strips 5 which extend along the longitudinal side edges 4a of the base 2. The width of the end portions 9 or the parts or end webs 10 forming the latter which are curved upward in the manner of a ski against the underside 2a of the base 2 corresponds exactly to the width of the two flat foot strips 5 extending along the longitudinal side edges 4a of the base 2, as clearly follows from FIG. 6. The pocket-like free spaces 7a accordingly also have the same depth as the pocket-like free spaces 7 adjoining them.

In the construction of a load carrier 1 or a storage and transporting box or container 1b seen in FIG. 6, it is important that the connections 11 of the upwardly curved ski-like end portions 9 or parts or end webs 10 at the underside 21 of the base 2 lie in front of the outer defining edge of the respective transverse foot strip 5 running parallel to the transverse side edge 4b of the base by an amount approximately corresponding to the radius of curvature of the ski shape. This step ensures that the smooth sliding of the respective load carrier 1 on the rollers of a roller transporting path 12 can not be impaired by the transverse foot strips 5. The load carrier 1 or the storage and transporting box or container 1b according to FIGS. 2 and 6 accordingly has the same use value as the load carrier 1 or storage and transporting box or container 1a according to FIGS. 1, 4 and 5. Namely, in each of these instances the running direction on the conveying paths, e.g. formed by roller transporting paths 12, as well as the direction of insertion into shelf installations are determined in an unequivocal manner by the rectangular outline shape, consequently ensuring the effectiveness of the end portions or parts 10 of the foot strips 5 which are curved upward in the manner of a ski against the underside 2a of the base 2.

In load carriers 1 and storage and transporting boxes or containers 1b having a square outline, as can be seen in FIG. 7, a determined running direction is not defined from the start. Therefore, a load carrier 1 with a square outline must be laid out in such a way that it also enables a trouble-free dynamic use on conveying paths and in shelf installations in a running direction which has not been determined for it beforehand.

In the load carrier 1 according to FIG. 7, flat foot strips 5 are provided continuously along all four defining edges 4 of the base 2.

End webs 10 which are curved upward in the manner of a ski are provided in this case only in the four corner regions of the flat foot strips 5 which converge at right angles. These end webs extend around the respective corner region at an additional curvature of 90°, i.e. they have a curved shape in both the vertical and horizontal directions as can be seen particularly from FIG. 8.

While the webs 6 fixing the flat foot strips 5 at a distance from the underside 2a of the base 2 extend transversely relative to the adjacent defining edge 4 of the base 2, it is important that diagonally extending stiffening ribs 16 adjoin the end webs 10 which are guided around the corner regions on a quarter circle in the horizontal direction and are curved upward in the manner of a ski. Together with the corner region of the flat foot strips 5 and the base 2, the diagonally extending stiffening ribs 16 define pockets 17 which open inward, i.e. toward the center of the base 2. Accordingly, a stable stiffening of the parts or end webs 10 which are curved in a two-dimensional manner is ensured in cooperation with the stiffening ribs 3 which are likewise constructed at the underside 2a of the base 2.

A load carrier 1 with the construction features seen in FIGS. 7 and 8 has the particular advantage that it is usable regardless of a predetermined running direction and nevertheless enables a trouble-free, dynamic use on conveying paths as well as in shelf installations.

FIGS. 4 to 7 also show parts of tools by means of which the respective load carrier 1 or storage and transporting boxes or containers 1a and 1b of plastic can be manufactured by means of the injection molding process. However, essentially only those tool parts used for forming the regions situated between the flat foot strips 5 and the underside 2a of the base 2 are shown.

For the sake of clarity, only two different tool parts 21 and 22 of the tool used for the production of the storage and transporting box or container 1a according to FIGS. 1 and 4 are shown, although the tool comprises a total of at least six cooperating tool parts.

The tool part 21 is designed in such a way that it determines the outer shape of the storage and transporting box or container 1a in the region of a transverse side wall 23, while the tool part 22 has a design determining the outer contour of a longitudinal side wall 24.

Since the tool part 21 also participates at the same time in determining the forming of a skirt edge 25 with gripping strips 26 at the upper end of the transverse side wall 23, it must be moved in the vertical direction, that is, in and opposite the direction of the arrow 27, to close and open the entire tool.

Moreover, the tool part 21 is designed in such a way that the outer contour of a part of the base 2 adjoining the transverse side wall 23 and the outer contour of the end portion 10 of the flat foot strips 5 which is curved upward against the underside 2a of the base 2 can also be determined with its help.

On the other hand, in addition to the outer contour of a longitudinal side wall 24, the inner contour of that region at the storage and transporting box or container 1a which is situated between the underside 2a of the base 2 and the upper side of the flat foot strip 5 is also determined by means of the tool part 22. For this reason the tool part 22 must be moved in and opposite the direction of the arrow 28 to close and open the entire tool parallel to the plane of the base 2, that is, in the horizontal direction.

The tool part 22 for determining the outer contour for the longitudinal side wall 24 is constructed as a side jaw at which a plurality of, e.g. four, core pieces 29 which project out laterally in the manner of a comb and, in addition, two end core pieces 30 are arranged. The core pieces 29 and the end core pieces 30 are separated from one another by spacing gaps whose width corresponds to the thickness of the webs 6 which securely connect the flat foot strips 5 with the underside 2a of the base 2 at a distance from the latter so as to form one piece. The free spaces 7 defined in a pocket-like manner between the flat foot strip 5 and the underside 2a of the base 2 are determined by means of the core pieces 29 of the tool part 22, while the two end core pieces 30 serve to form the pocket-like free spaces 7a. Since the pocket-like free spaces 7a have a substantially greater depth than the pocket-like free spaces 7, the end core pieces 30 also have a correspondingly greater overall length than the core pieces 29. Moreover, the end core pieces 30 comprise a rounded portion 32 at their outer upper edge which determines the inner curvature for the end portions 9 or parts or end webs 10 of the flat foot parts 5 which are curved upward in the manner of a ski. A trough 33 which is worked into the upper end region of the tool part 21 serves for the forming of the outer curvature of these end portions 9 or parts or end webs 10.

The longitudinal dimensioning of the end core pieces 30 is provided in such a way that a gap corresponding to the thickness of the dividing wall 15 remains between the facing end faces of the end core pieces 30 when two tool parts 22 of the same construction move together in opposite directions. The dividing wall 15 between the adjacent pocket-like free spaces 7a which remain open toward opposite sides is formed in the closed tool by the plastic melt penetrating into this gap.

The tool part 22 is shown only partially in FIG. 5. It is distinguished from the corresponding tool part 22 according to FIG. 4 substantially only in that the end core pieces 30 having the rounded portion 32 have a length such that they project out beyond the length of the core pieces 29 only relatively slightly. Accordingly, the pocket-like free spaces 7a between the underside 2a of the base 2 and the flat foot strip 5 parallel to the transverse side edge 4b according to FIG. 5 are formed so as to be correspondingly shorter than the same pocket-like free spaces 7a according to FIG. 4 when the entire tool is closed.

The tool serving to produce the storage and transporting box or container 1a according to FIG. 6 differs from that for producing the storage and transporting box or container 1a according to FIGS. 4 and 5 in that the outer contour of the transverse side walls 34 as well as the outer contour of the longitudinal side walls 35 is determined by a tool part 36 and 37, respectively, constructed as a side jaw. The tool parts 36 and 37 are moved together horizontally or parallel to the plane of the base 2 opposite the direction of arrows 38 and 39 in order to close the entire tool and are moved apart in the direction of these arrows 38 and 39 to open the entire tool.

The tool part 36 is provided with three core pieces 40 which project out laterally in the manner of a comb, spacing gaps 41 being provided between the latter serving to form the webs 6 below the flat foot strips 5 which extend parallel to the transverse side edges 4b of the base 2. The core pieces 40 determine the forming of the pocket-like free spaces 7 between the formed webs 16 and the base 2 and the flat foot strip 5.

Four core pieces 42 which adjoin one another in a comb-like manner and two outer end core pieces 43 with rounded portions 44 at their outer upper edges are located at the tool part 37. The core pieces on the one hand and the end core pieces 43 on the other hand are also separated from one another in this instance by spacing gaps 45. While the spacing gaps 45 form free spaces for forming the webs 6 between the underside 2a of the base 2 and the flat foot strip 5 which extends parallel to the longitudinal defining edge 4a of the base 2, the pocket-like free spaces 7 in the region of the longitudinal side edges 4a of the base are determined by the core pieces 42 and the end core pieces 43. The rounded portions 44 at the end core pieces 43 ensure that the inner contour of the end portions 9 or parts or end webs 10 at the flat foot strips 5 which are curved upward in the manner of a ski is formed.

To produce the storage and transporting box or container 1b, according to FIG. 7, which has a square outline, a tool can be used which works with four identical tool parts 46 designed as horizontally movable side jaws. For the sake of simplicity, only two of the four tool parts 46 constructed as side jaws are shown in FIG. 7. Each of these tool parts 46 is outfitted with two core pieces 47 which project out horizontally in a comb-like manner and an end core piece 48 is present at both sides of same.

It is important in this instance that the end core pieces 48 have a bevel 49 at their outer laterally defining edge, which bevel 49 extends in the direction of the angle bisecting line to the respective corner region of the storage and transporting box or container 1b to be produced and terminates in a rounded portion 50 enclosing an arc angle of 45°.

The bevels 49 and rounded portions 50 of two tool parts cooperating in a corner region cooperate in this corner region in addition with a core form 51 which is movable diagonally under the base 2 in order to form, between these tool parts 46 and 51, the rounded parts or end webs 10 which are curved up in the manner of a ski and simultaneously guided around the corner region in an arc-shaped manner on the one hand and the stiffening ribs 16 adjoining the latter on the other hand. The arrows in FIG. 7 indicate how the tool parts 46 are moved apart horizontally for opening the entire tool on the one hand and how the additional core forms 51 must be moved together diagonally for the same purpose on the other hand.

I claim:

1. Load carrier of plastic, in which a base having a planar upper surface is stabilized on the underside by stiffening ribs and in which flat foot strips lying in the direction of the base plane extend at least along two defining edges of the base running parallel to one another, are supported at a distance below the base plane by webs directed transversely relative to the respective defining edge, and form stand surfaces of the load carrier, wherein there are free spaces between the underside of the base, the upper side of the foot strips and the transversely directed webs, which free spaces are enclosed to form pockets and are open at least toward the defining edge, characterized in that the end portions (9) of the flat foot strips (5) are formed by parts (10) which are curved upward transversely relative to their longitudinal direction in the shape of a ski until meeting the underside (2a) of the base and have a secure connection (11) at the base (2) and accordingly simultaneously form an end web serving to define a pocket-like free space (7a).

2. Load carrier according to claim 1, characterized in that the flat foot strips (5) are assigned to the two longitudinal side edges (4a) of the base (2).

3. Load carrier according to claim 1, characterized in that the flat foot strips (5) are assigned to the longitudinal side edges (4a) as well as to the transverse side edges (4b) of the base (2).

4. Load carrier according to one of claims 1 to 3, characterized in that the base has a rectangular or square outline.

5. Load carrier according to claim 1, wherein flat foot strips (5) extend along all four defining edges (4) of the rectangular or square base (2), but in that only two parallel flat foot strips (5) have associated end portions (9) or end webs (10) which are curved upward in the manner of a ski.

6. Load carrier according to claim 1, wherein the end portions (9) or end webs (10) which are curved upward in the manner of a ski have a width corresponding to the width of the adjoining foot strips (5) (FIG. 6).

7. Load carrier according to claim 1, wherein the width of the end portions (9) or end webs (10) which are curved upward in the manner of a ski exceeds the width of the adjoining foot strip (5) (FIGS. 4 and 5), wherein these end portions (9) or end webs (10) preferably also form and define a partial length of a transversely extending flat foot strip (FIG. 5).

8. Load carrier according to claim 1, wherein the end portions (9) or end webs (10) which are curved upward in the manner of a ski extend in a continuous manner along the entire length of a transversely extending flat foot strip (5) (FIG. 4) and along with the latter enclose correspondingly deep, pocket-like free spaces (7a).

9. Load carrier according to claim 8, wherein two pocket-like free spaces (7a) which are flush with one another are divided by a dividing wall (15) lying on half the length of the transversely extending flat foot strip (5) (FIG. 4).

10. Load carrier according to claim 1, wherein end portions (9) or end webs (10) which are curved upward in the manner of a ski are provided only in the four corner regions of the flat foot strips (5) which converge at right angles, and in that these end portions (9) or end webs (10) extend around these corner regions with a curvature of 90° (FIGS. 7 and 8).

11. Load carrier according to claim 10, wherein diagonally extending stiffening ribs (16) which, together with the flat foot strips (5), enclose pockets (17) opening inward, i.e. toward the center of the base (2), adjoin the end portions (9) or end webs (10) which enclose the corner areas in an arc-shaped manner and are curved upward in the manner of a ski.

12. Tool for the production of load carriers of plastic in which a base having planar upper surface is stabilized on the underside by stiffening ribs and in which flat foot strips lying in the direction of the base plane extend at least along two defining edges of the base running parallel to one another, are supported at a distance below the base plane by webs directed transversely relative to the respective defining edge, and form stand surfaces of the load carrier, wherein there are free spaces between the underside of the base, the upper side of the foot strips and the transversely directed webs, which free spaces are enclosed to form pockets and are open at least toward the defining edge, characterized in that the end portions (9) of the flat foot strips (5) are formed by parts (10) which are curved upward transversely relative to their longitudinal direction in the shape of a ski until meeting the underside (2a) of the base and have a secure connection (11) at the base (2) and accordingly simultaneously form an end web serving to define a pocket-like free space (7a), in addition to a tool part determining the flat or smooth inner shape of the load carrier, also comprises a plurality of tool parts which are movable relative to one another and determine the outer shape which is provided with ribs, webs, reliefs or the like, characterized in that the tool parts forming the free spaces (7, 7a) which are defined in a pocket-like manner between the flat foot strip (5) and the underside (2a) of the base (2) are designed as core pieces (29, 30 or 40 and 42, 43) which are arranged at side jaws (22 or 36, 37), which are movable parallel to the base plane, and project out laterally in a comb-like manner, the end core pieces (30 or 43) of these core pieces (29, 30 or 40 and 42, 43) having rounded portions (32 or 40) whose shaping corresponds to the inner contour of the end portions (9) or end webs (10) at the flat foot strips (5) which are curved upward in the manner of a ski.

13. Tool according to claim 12, wherein the length of the core pieces (29) in each instance corresponds the depth of the free spaces (7) which are enclosed in a pocket-like manner, while the length of the end core pieces (30) is adapted to the width of the end portions (9) or end webs (10) which adjoin the foot strips (5) and are curved upward in the manner of a ski.

14. Tool according to claim 12, wherein the end core pieces (30) are lengthened so as to project out in front of the core pieces (29) and have a length which corresponds at least approximately to half the width of the load carrier (1).

15. Load carrier according to claim 12, wherein the end core pieces (30) are lengthened so as to project out in front of the core pieces (29), which lengthening exceeds the width of a foot strip (5) by a certain extent and determines a correspondingly deepened pocket-like free space (7a) (FIG. 5).

16. Tool for the production of load carriers of plastic in which a base having planar upper surface is stabilized on the underside by stiffening ribs and in which flat foot strips lying in the direction of the base plane extend at least along two defining edges of the base running parallel to one another, are supported at a distance below the base plane by webs directed transversely relative to the respective defining edge, and form stand surfaces of the load carrier, wherein there are free spaces between the underside of the base, the upper side of the foot strips and the transversely directed webs, which free spaces are enclosed to form pockets and are open at least toward the defining edge, characterized in that the end portions (9) of the flat foot strips (5) are formed by parts (10) which are curved upward transversely relative to their longitudinal direction in the shape of a ski until meeting the underside (2a) of the base and have a secure connection (11) at the base (2) and accordingly simultaneously form an end web serving to define a pocket-like free space (7a), the tool parts forming the free spaces (7, 7a) defined in a pocket-like manner between the flat foot strip (5) and the underside (2a) of the base (2) are designed as core pieces (47, 48) which are arranged at side jaws (46), which are movable parallel to the base plane, and project out laterally in a comb-like manner, the end core pieces (48) of the cores pieces (47, 48)

assigned to the corner regions being provided with bevels (49) which extend in the direction of an angle bisecting lines to the respective corner region and terminate in a rounded portion (50) enclosing an arc angle of 45°, and in that a diagonally movable core form (51) below the base (20) is assigned, in addition, to every corner regions (FIGS. 7 and 8).

* * * * *